(12) United States Patent
Ye

(10) Patent No.: US 8,235,225 B2
(45) Date of Patent: Aug. 7, 2012

(54) INSTALLATION ASSEMBLY FOR HARD DISK DRIVE

(75) Inventor: Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 26 days.

(21) Appl. No.: 12/979,342

(22) Filed: Dec. 28, 2010

(65) Prior Publication Data
US 2012/0152867 A1    Jun. 21, 2012

(30) Foreign Application Priority Data
Dec. 21, 2010   (CN) .......................... 2010 1 0598601

(51) Int. Cl.
H05K 7/16 (2006.01)
A47G 19/08 (2006.01)
A47B 81/00 (2006.01)
A47B 97/00 (2006.01)

(52) U.S. Cl. .................... 211/41.12; 312/223.2; 361/725

(58) Field of Classification Search ............... 312/223.2, 312/351, 334.4; 211/26, 41.12, 26.2, 71.01, 211/195, 189, 194, 190, 183; 361/679.31–679.39, 361/724–727
See application file for complete search history.

(56) References Cited

U.S. PATENT DOCUMENTS

| | | | |
|---|---|---|---|
| 4,577,818 A * | 3/1986 | Clarisse .......................... 248/27.3 |
| 5,549,375 A * | 8/1996 | Pagliaccio ................. 312/319.1 |
| 5,768,097 A * | 6/1998 | Jelinger ................... 361/679.37 |
| 5,801,920 A * | 9/1998 | Lee ........................... 361/679.31 |
| 6,299,266 B1 * | 10/2001 | Justice et al. ............... 312/223.2 |
| 6,318,679 B1 * | 11/2001 | Yang et al. ................... 248/27.1 |
| 6,373,695 B1 * | 4/2002 | Cheng ........................ 361/679.39 |
| 6,556,434 B1 * | 4/2003 | Chan et al. ............... 361/679.33 |
| 6,590,775 B2 * | 7/2003 | Chen ............................. 361/725 |
| 6,651,936 B2 * | 11/2003 | Upson et al. .................. 248/27.3 |
| 6,805,248 B2 * | 10/2004 | Champion et al. .............. 211/26 |
| 7,036,783 B2 * | 5/2006 | Chen et al. .................. 248/298.1 |
| 7,085,131 B2 * | 8/2006 | Peng et al. ................. 361/679.32 |
| 7,102,885 B2 * | 9/2006 | Chen et al. ............... 361/679.31 |
| 7,106,596 B1 * | 9/2006 | Reznikov ....................... 361/724 |
| 7,388,754 B2 * | 6/2008 | Chen ............................. 361/724 |
| 7,443,667 B2 * | 10/2008 | Guo et al. ................. 361/679.33 |
| 7,490,810 B2 * | 2/2009 | Peng et al. ..................... 248/694 |
| 7,551,434 B2 * | 6/2009 | Zhu et al. ................. 361/679.33 |
| 7,564,692 B2 * | 7/2009 | Hsiung ........................ 361/730 |
| 7,583,497 B2 * | 9/2009 | Roesner .................... 361/679.33 |
| 7,903,401 B2 * | 3/2011 | Lee et al. ................. 361/679.33 |
| 7,921,439 B2 * | 4/2011 | Christie, Jr. ................... 720/728 |
| 8,054,624 B2 * | 11/2011 | Chen et al. ............... 361/679.37 |
| 8,064,195 B2 * | 11/2011 | Zhang et al. ............. 361/679.33 |

(Continued)

*Primary Examiner* — Darnell Jayne
*Assistant Examiner* — Kimberley S Wright
(74) *Attorney, Agent, or Firm* — Altis Law Group, Inc.

(57) ABSTRACT

An installation assembly for hard disk drives (HDDs) includes a rack and a number of holding members. The rack defines a receiving space and respectively defines two rows of through holes in opposite sides bounding the receiving space. Each holding member includes a frame for receiving a HDD and two arms pivotably installed to opposite sides of the frame. Opposite sides of the frame respectively define two through holes therein. Two pins extend from an inner side of each arm. The frame is received in the receiving space of the rack and movably up and down in the rack. The pins of the arms extend through the corresponding through holes of the rack and the frame to engage with the HDD.

4 Claims, 4 Drawing Sheets

U.S. PATENT DOCUMENTS

| | | | |
|---|---|---|---|
| 8,132,869 B2 * | 3/2012 | Wang et al. | 312/223.2 |
| 2008/0265125 A1 * | 10/2008 | Ye et al. | 248/672 |
| 2009/0167124 A1 * | 7/2009 | Lee et al. | 312/223.2 |
| 2010/0259885 A1 * | 10/2010 | Zheng et al. | 361/679.36 |

* cited by examiner

INSTALLATION ASSEMBLY FOR HARD DISK DRIVE

BACKGROUND

1. Technical Field

The present disclosure relates to an installation assembly for hard disk drives (HDD)s.

2. Description of Related Art

In a server, a high density storage with a number of HDDs is provided. Generally, the wider that the spaces are between adjacent HDDs, the more effective the heat dissipation will be for the HDDs. However, with the common designs, a space between adjacent HDDs is fixed. Thus, when the thermal environment is bad for dissipating heat for the storage, the sever may not operate normally.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
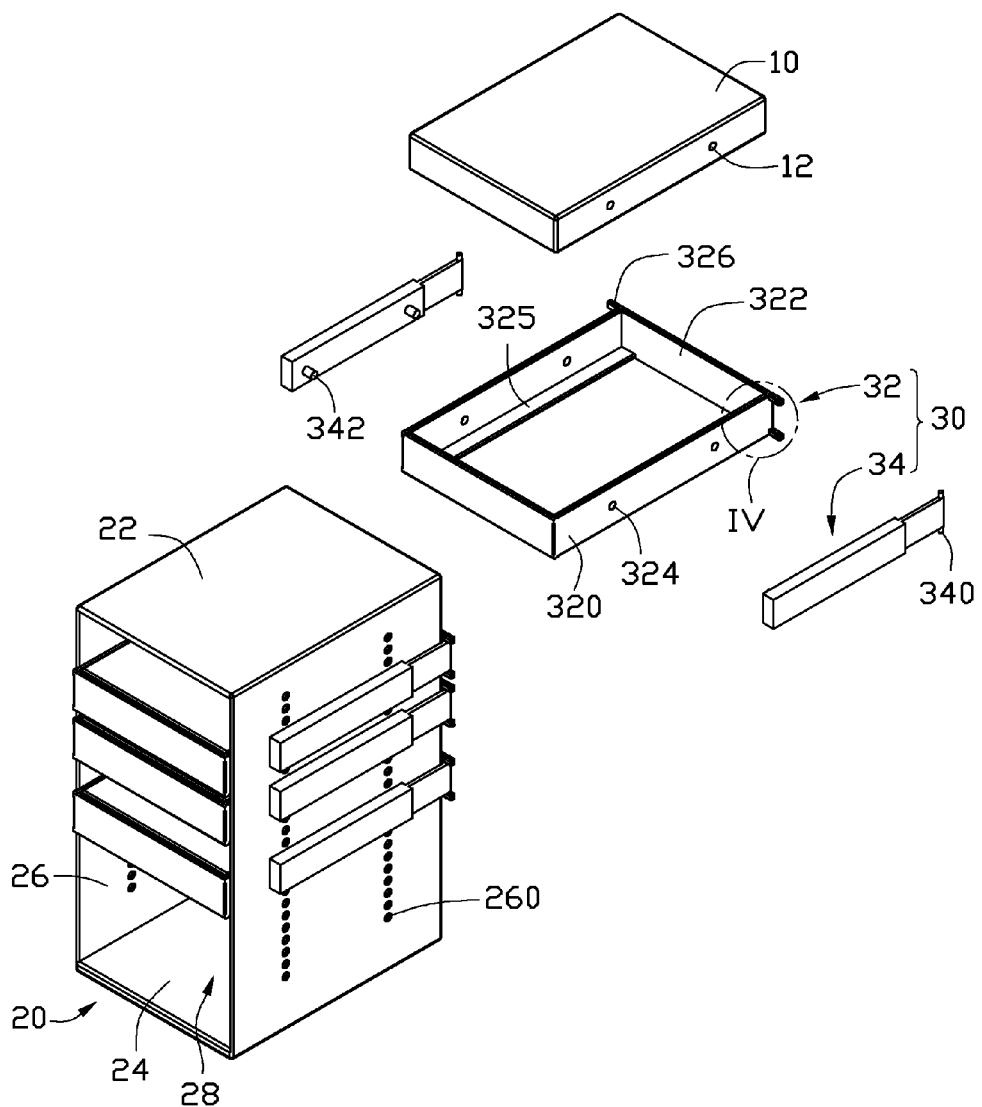
FIG. 1 is an exploded, isometric view of an exemplary embodiment of an installation assembly for HDDs, showing with the HDDs.

Referring to FIG. 1, an exemplary embodiment of an installation assembly is used for installing a plurality of HDDs 10. The installation assembly includes a rack 20 and a plurality of holding members 30.

The HDD 10 is substantially rectangular-shaped, and respectively defines two spaced fixing holes 12 at each opposite side of the HDD 10.

The rack 20 is hollow and substantially rectangular-shaped, and defines a receiving space 28 therein. The rack 20 includes a top board 22, a base board 24 opposite to the top board 22, and two side boards 26 substantially perpendicularly connected between corresponding sides of the top board 22 and the base board 24. Each side board 26 defines two rows of spaced through holes 260. Each row of through holes 260 are arranged from top to bottom. In this embodiment, a space between two adjacent through holes 260 in the same row is about 5 millimeters.

Figure 4:
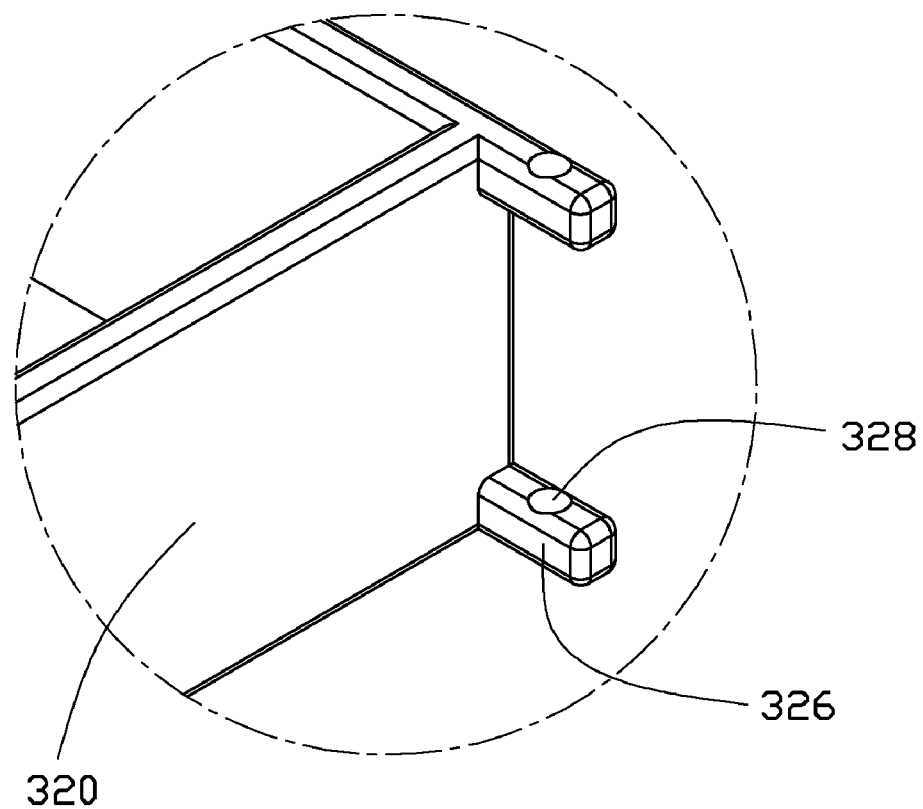
FIG. 4 is an enlarged view of the circled portion IV of FIG. 1.

Each holding member 30 includes a frame 32 and two arms 34. The frame 32 includes two parallel sidewalls 320 and two end walls 322 substantially perpendicularly connected between corresponding ends of the sidewalls 320. Each sidewall 320 defines two spaced through holes 324. Two supporting plates 325 respectively extend from bottoms of the sidewalls 320 toward each other. Two posts 326 (labeled in FIG. 4) substantially perpendicular to the sidewalls 320 extends from opposite ends of a top and a bottom of each end wall 322, each post 326 defines a fixing hole 328 therein from top to bottom. Two engaging portions 340 respectively extend from a top and a bottom of an end of each arm 34. Two spaced pins 342 extend from a side of each arm 34.

Figure 2:
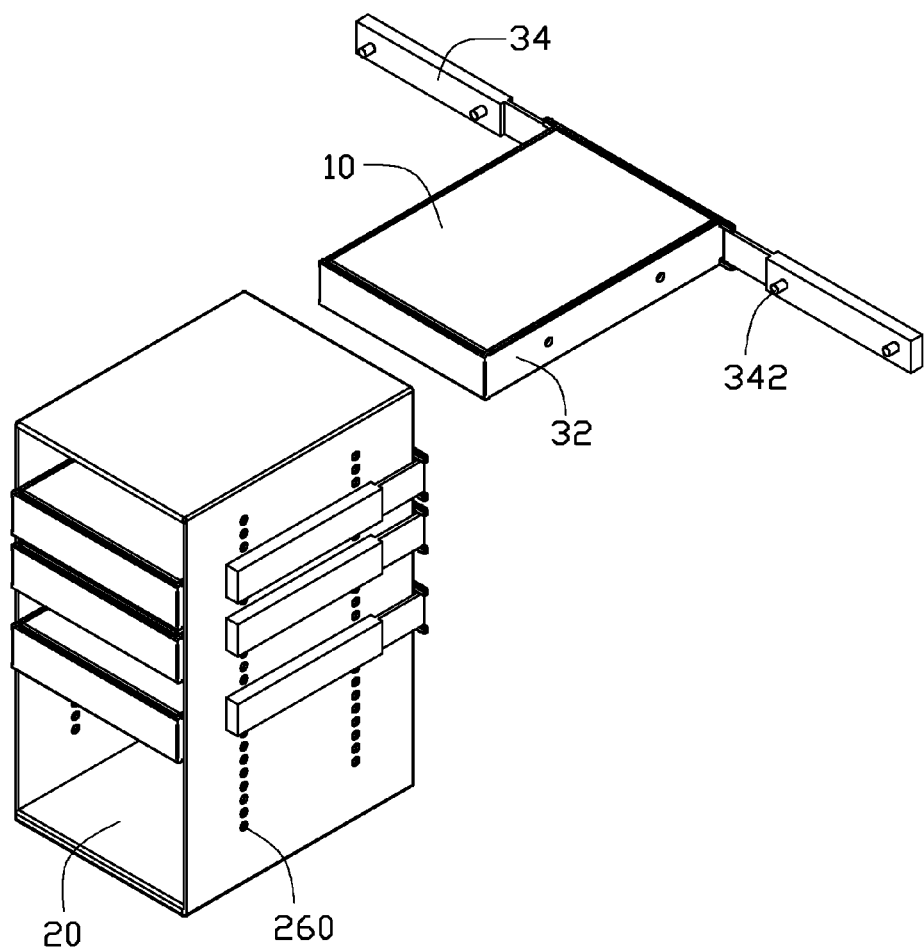
FIG. 2 is a partially assembled, isometric view of FIG. 1.
Figure 3:
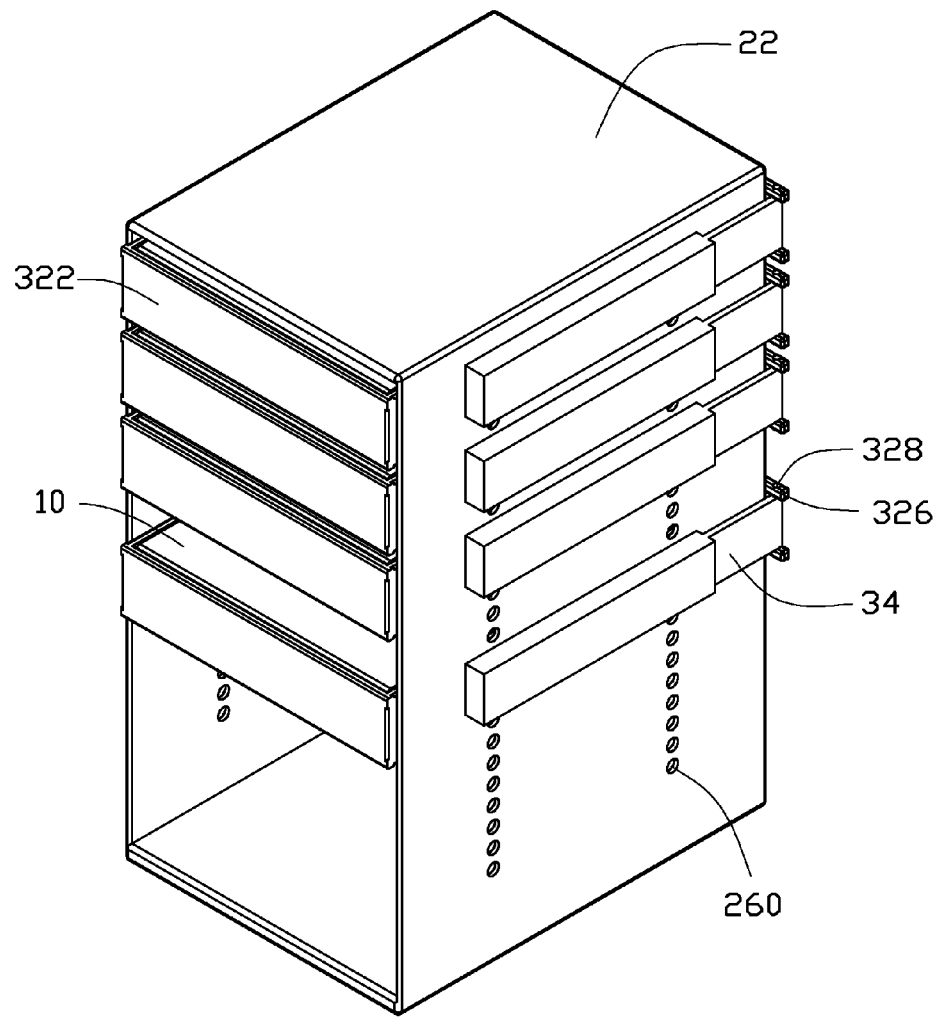
FIG. 3 is an assembled, isometric view of FIG. 1.

Referring to FIG. 2 and FIG. 3, in assembly, the engaging portions 340 of the arms 34 respectively engage in the fixing holes 328 of the posts 326, thereby pivotably mounting the arms 34 to opposite sides of the frame 32. At this time, the pins 342 of the arms 34 oppose the corresponding through holes 324 of the frame 32. An HDD 10 is received in the frame 32 and is supported by the supporting plates 25, with the fixing holes 12 of the HDD 10 aligned with the corresponding through holes 324 of the frame 32. The frame 32 is received in the receiving space 28 of the rack 20, with the through holes 324 of the frame 32 aligned with the corresponding through holes 260 of the rack 26, and the arms 34 are rotated to sandwich the rack 20. The pins 342 of the arms 34 extend through the corresponding through holes 260 of the rack 20, through the corresponding through holes 324 of the frame 32, and then are engaged in the corresponding fixing holes 12 of the HDD 10, to install the HDD 10 to the rack 20.

Furthermore, the holding members 30 are capable of moving up and down along in the rack 20; therefore, a space between two adjacent HDDs 10 is adjustable.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. An installation assembly for hard disk drives (HDDs), the assembly comprising:
    a rack comprising two opposite side boards bounding a receiving space, each side board defining two rows of first through holes therein, each row of first through holes arranged from top to bottom of the side board; and
    a plurality of holding members, each holding member comprising a frame and two arms, the frame comprising two opposite sidewalls to hold an HDD between the sidewalls, the arms pivotably mounted to outer surfaces of the sidewalls of the frame, each sidewall defining two second through holes, two pins extending from an inner side of each arm;
    wherein when the frame is received in the receiving space of the rack, the arms are operable to rotate to sandwich the rack and the pins of the arms are operable to extend through corresponding ones of the plurality of the first through holes, from both the side boards, that are aligned with the two second through holes and the two second through holes to mount the frame to the rack.

2. The assembly of claim 1, wherein the arms are pivotably mounted to opposite sides of the frame, adjacent to an end of the frame.

3. The assembly of claim 2, wherein the frame further comprises an end wall connected between the sidewalls at the end of the frame, two post extend from a top and a bottom of each end of the end wall, two engaging portions extend from a top and a bottom of an end of each arm; the end of each arm is located between the posts of a corresponding end of the end wall, with the engaging portions of the arms pivotably engaged with the corresponding posts of the frame.

4. The assembly of claim 1, wherein a space between adjacent two through holes in a same row of the side board of the rack is about 5 millimeters.

* * * * *